United States Patent Office 2,892,840
Patented June 30, 1959

2,892,840

PREPARATION OF CYTOSINE AND INTERMEDIATES

Peter J. Tarsio, Stony Point, and Leonard Nicholl, Nyack, N.Y., assignors to Kay-Fries Chemicals Inc., West Haverstraw, N.Y., a corporation of New York No Drawing. Application December 5, 1955
Serial No. 550,823

10 Claims. (Cl. 260—256.4)

The invention pertains to the preparation of cytosine and to the preparation of intermediates therefor. More particularly, it relates to the utilization of an acrylonitrile derivative as a starting material and includes correlated improvements and discoveries whereby the preparation of cytosine is enhanced.

Previous procedures for the preparation of cytosine have employed uracil, thiouracil, dithiouracil and cyanoacetal as starting materials.

The principal object of the present invention is to provide an improved process for the preparation of cytosine.

Another object of the invention is the provision of a process for the preparation of cytosine which entails the use of a substituted unsaturated nitrile as the starting material.

A further object of the invention is to provide a procedure for the preparation of cytosine in which a b-alkoxy acrylonitrile serves as the intermediate.

An additional object of the invention is the provision of a process in accordance with which b-alkoxy acrylonitriles, e.g. b-ethoxy acrylonitrile may be produced.

A still further object of the invention is the provision of procedures for the ready, effective and economical preparation of b-alkoxy acrylonitriles and of cytosine therefrom, and of isoxazole.

Particular objects of the invention are to provide a process for the preparation of b-alkoxy acrylonitriles through reaction of isoxazole, sodium ethoxide and an alkyl iodide, or of isoxazole, a dialkyl sulfate and a caustic alkali; a process for the preparation of cytosine through reaction of a b-alkoxy acrylonitrile with urea in a medium containing an alkali metal alcoholate at an elevated temperature, and a process for the preparation of isoxazole by reacting hydroxylamine hydrochloride and a malonaldehyde diacetal.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention, cytosine may be produced through the reaction of a b-alkoxy acrylonitrile in which the alkyl group has a carbon content of $C_1$–$C_{10}$, for example, methyl, propyl, isopropyl, a butyl, an octyl and a decyl group, and specifically b-ethoxy acrylonitrile, with urea in a medium which contains an alkali metal alcoholate. The alkali metal may be sodium or potassium, and the alcohol aliphatic and having a carbon content from $C_1$–$C_{10}$, hence ethyl, a propyl, an amyl, a heptyl and a decyl alcohol, and more particularly, utilization may be made of sodium methoxide and sodium n-butoxide. The temperature at which the preparation of cytosine is conducted may be from about 75° C. to about 115° C. Further, the temperature may be from about 75° C. to about 85° C. when using sodium methoxide, and from about 112° C. to about 115° C. when using sodium n-butoxide.

When the reaction between b-ethoxy acrylonitrile and urea, for the purpose of illustration and representative, is substantially complete, the reaction mass is treated with sulfuric acid which may have a concentration of 2 N, followed by heating at a temperature of about 80° C. and then adding ethyl alcohol for a period of about one hour with maintenance of a temperature from about 80° C. to about 85° C. during this addition. The reaction mixture is cooled to a temperature of about 20° C., whereupon cytosine sulfate separates. This is removed by filtering and the cytosine sulfate thus obtained is dissolved in water and ammonium hydroxide having a concentration of about 29% ammonia added, whereby crude cytosine is precipitated. The crude material is purified by separation thereof from the medium, dissolving in hot water, decolorizing by means of a suitable charcoal, e.g. "Darco," with removal of the decolorizing agent and cooling to a temperature of about 20° C., whereby cytosine deposits in the form of colorless plates.

The preparation of the intermediate b-alkoxy acrylonitriles may be effected by reacting isoxazole with an alkali metal alcoholate, as described above, with formation of an alkali metal cyanoacetaldehyde, for example with a sodium or potassium alkoxide, such as sodium methoxide, desirably at a temperature at least as low as 10° C. and for a period of about three hours, with formation of sodium cyanoacetaldehyde. The sodium cyanoacetaldehyde is reacted with an alkyl halide selected from the group consisting of chloride, bromide and iodide, e.g. with ethyl iodide at substantially the boiling temperature of the reaction mass, suitably under reflux conditions for about two-and-a-half hours. The produced alcohol is then removed, desirably at atmospheric pressure, whereupon water is added and the b-alkoxy acrylonitrile obtained through steam distillation. It is to be understood that other alkyl halides, as iodides, may be utilized in which the alkyl group has a carbon content of $C_1$–$C_{10}$, viz. those hereinbefore mentioned.

Another procedure for the preparation of the b-alkoxy acrylonitrile is through reaction of an alcoholic solution containing isoxazole with an alkyl ester of an acid selected from the group consisting of sulfuric, phosphoric, boric, benzene sulfonic and toluene sulfonic acids in which all of the acidic hydrogens are replaced by alkyl groups, thus with a dialkyl sulfate, as diethyl sulfate. Moreover, the alkyl group may have a carbon content of $C_1$–$C_{10}$. The reaction may be carried out at a temperature of about 10° C. with addition of an alkali metal hydroxide, e.g., sodium or potassium hydroxides, and maintenance of a temperature not greater than about 10° C., e.g. 5°–10° C. This temperature may be maintained for a period of about four hours, and with agitation at a temperature from about 5° C. to about 10° C. for a period which may be up to about 2 hours. The alcohol is then removed at atmospheric pressure, and following the addition of water, the b-alkoxy acrylonitrile is obtained through steam distillation. The alkyl esters may be either simple or mixed. Other alkyl esters, specifically, are triethyl borate, diethyl carbonate, triethyl phosphate, ethyl toluene sulfonate and ethyl benzene sulfonate.

As solely an illustrative embodiment of a manner in which the invention may be practiced for the production of cytosine, the following examples are presented.

EXAMPLE I

Materials (1) 20 gms. b-ethoxy acrylonitrile (92.5% purity) (0.191 mole).
(2) 76 gms. sodium methoxide solution (11.64% sodium) (0.385 atom).
(3) 23 gms. urea (dry) (0.384 mole).

Procedure

The above reactants were mixed and heated to reflux for six hours at 75° C. to 85° C. The alcohol was removed under reduced pressure of 25 mm. of mercury, and the residue that remained was treated with 480 cc. of 2 N sulfuric acid. The solution was heated to 80° C. and 960 cc. of 95% alcohol added over an hour period keeping reaction mixture at reflux (80°–85° C.). The mixture was cooled to 20° C. and the crude cytosine sulfate filtered. The crude sulfate was added to 200 cc. of water and 8 cc. of 29% ammonia solution added. The crude cytosine that precipitated was filtered and charcoaled in 200 cc. of water. After filtration and cooling the solution deposited large colorless plates of cytosine. The cytosine was dried at 100° C. for 16 hours. It browned at 300° C. and melted from 318°–324° C. with decomposition.

EXAMPLE II

Materials (1) 22 gms. b-ethoxy acrylonitrile (92.5% pure) (0.208 mole).
(2) 4.8 gms. sodium (0.209 mole).
(3) 155 cc. dry n-butanol.
(4) 12.5 gms. urea (0.209 mole).
(5) 261 cc. 2 N sulfuric acid.
(6) 502 cc. 95% ethanol.
(7) 8 cc. 29% ammonia solution.

Procedure

The urea and nitrile were added to the previously prepared solution of sodium-n-butoxide and the mixture refluxed for two hours at 112° C. to 115° C. The slurry was cooled to 20° C. and the 2 N sulfuric acid added. After 15 minutes agitation the butanol was separated. The aqueous acid solution was heated to 80° C. and the ethyl alcohol added over an hour period to the solution kept at 80° C. to 85° C. The mixture was cooled to 20° C. and the cytosine sulfate filtered off. The sulfate was added to 300 cc. of water and the cytosine precipitated by the addition of the ammonia solution. The crude cytosine was filtered off, added to 200 cc. water and charcoaled. After filtration and cooling to 20° C., the filtrate deposited large colorless plates of cytosine. The cytosine obtained was dried at 100° C. for 16 hours.

Preparation of the intermediate b-ethoxy acrylonitrile has been effected previously by the de-alcoholation of cyanoacetal in the presence of a catalytic amount of sulfuric acid. Cyanoacetal has been prepared by the (1) cyanation of bromoacetal, (2) dehydration of BB diethoxy propionamide with phosphorus pentoxide.

We discovered, illustratively, that b-ethoxy acrylonitrile can be produced through utilization of isoxazole, which is reacted with sodium ethylate solution to form the sodium derivative of cyanoacetaldehyde, and alkylating the resulting mixture with ethyl iodide or, adding an aqueous caustic solution to a mixture of isoxazole and diethyl sulfate in aqueous alcohol solution. The desired compound is isolated from the reaction mixture by removing the alcohol under reduced or atmospheric pressure and the resulting residue steam distilled at atmospheric pressure. The oil that separates is distilled under reduced pressure.

The reactions involved are as follows:

(1)
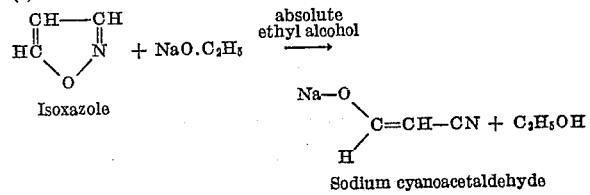

Sodium cyanoacetaldehyde (2)
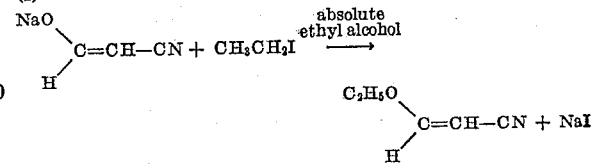

(3)
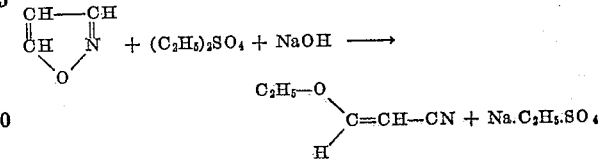

The preparation of b-ethoxy acrylonitrile is illustratively shown in the following examples.

EXAMPLE III 742 gms. of sodium ethylate solution containing 46 gms. sodium (2 gm. atoms) are added over a three-hour period to 150 gms. of isoxazole (94.2% purity or 2 moles), keeping reaction temperature below 10° C. during the addition. During the course of the reaction the sodium salt of cyanoacetaldehyde precipitates with considerable evolution of heat. The mixture is then stirred for an additional hour below 10° C. to complete reaction. 343 gms. of ethyl iodide (2 moles+10% excess) are then added and the temperature brought to boiling by means of a water bath. Reflux is continued for 2.5 hours, alkylation being complete at the end of this time. The alcohol is stripped at atmospheric pressure. Water is then added to the residue and the product steam distilled. The separated oil is dried and distilled under vacuum of 5 mm. of mercury. There is obtained 73 gms. of material boiling 65°–67° C. at 5 mm. of mercury.

EXAMPLE IV 561 gms. of isoxazole solution [containing 88.5 gms. of isoxazole (1.285 moles), 365.5 gms. ethanol and 105 gms. water] and 570 gms. of diethyl sulfate (3.7 moles) are charged to a 2-liter flask and cooled to 10° C. with stirring. 152.5 gms. of NaOH (97% purity or 3.7 moles) in 458 gms. of water are then added over a 4 hour period maintaining temperature from 5°–10° C. The mixture is then stirred for 2 hours at 5°–10° C.; heated to reflux, and the alcohol removed through a packed column up to a vapor temperature of 95° C. The column is then removed, water added to the residue and the product steam distilled. Approximately 1200 cc. of water is required to steam distill the product completely. The oil (approximately 133 cc.) is then distilled under 10 mm. of mercury pressure. After removal of a small amount of alcohol and water, there is obtained 114 gms. of oil boiling 50°–52° C. at 1 mm. of mercury.

Isoxazole employed for the preparation of b-ethoxy acrylonitrile is producible through reaction of hydroxylamine hydrochloride with a malonaldehyde diacetal, as illustrated by the following procedure.

EXAMPLE V

Materials (1) 412 gms. 1,1,3,3-triethoxy methoxy propane (malonaldehyde diacetal) (2.0 moles).
(2) 140 gms. $NH_2OH.HCl$ in 300 cc. water.
(3) 106 gms. $Na_2CO_3$ in 300 cc. water.

Procedure

The aqueous solution of $NH_2OH.HCl$ is added to the malonaldehyde diacetal (2.0 moles) and the mixture heated from 60°–70° C. for two hours. The resulting one-phase solution was cooled to 20° C. and the liberated HCl neutralized with the $Na_2CO_3$ solution. The solution was diluted to 2 liters with water, and the resulting mixture extracted with ether. The ether extract was dried with $CaCl_2$. After removal of the ether, isoxazole was obtained. It will be realized that alkoxy groups of higher carbon content than ethoxy, as propoxy, butoxy and like homologous groups may be present in the propane derivative.

Desirable or comparable results may be achieved with various modifications of the foregoing within the broad range set forth herein, thus; the alkyl groups of higher carbon content occasion the employment of variations in reaction temperature; duration of refluxing, solubility characteristics of reactants, and conditions for removal of the formed alcohol.

The procedures therein described are characterized by the following advantages:

a. The raw materials required in the syntheses are comparatively inexpensive and easily available;
b. The products are obtained in substantial yields;
c. The method proposed for each of the products is simple and does not require special equipment, and
d. The products prepared by the reactions are not accompanied by any by-products which are difficult to separate, thus enabling easy purification as by simple distillation or crystallization.

It will thus be seen that the objects set forth above, among those made apparent from the preceding description, are efficiently attained and, since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A process for the preparation of cytosine which comprises reacting a b-alkoxy acrylonitrile, said alkoxy group having a carbon content $C_1$–$C_{10}$, with urea, in a medium consisting essentially of an alkali metal alcoholate, said alcohol having a carbon content $C_1$–$C_{10}$, at a temperature from about 75° C. to about 115° C., with attending formation of cytosine.

2. A process for the preparation of cytosine which comprises reacting b-ethoxy acrylonitrile with urea in a medium consisting essentially of an alkali metal alcoholate, said alcohol having a carbon content $C_1$–$C_{10}$, at a temperature from about 75° C. to about 115° C. with attending formation of cytosine.

3. A process for the preparation of cytosine which comprises reacting a b-alkoxy acrylonitrile in which the alkoxy group has a carbon content of $C_1$–$C_{10}$, with urea in a medium consisting essentially of a sodium alcoholate with attending formation of cytosine.

4. A process for the preparation of cytosine which comprises reacting b-ethoxy acrylonitrile with urea in a medium consisting essentially of sodium methoxide at a temperature from about 75° C. to about 85° C. with attending formation of cytosine.

5. A process for the preparation of cytosine which comprises reacting b-ethoxy acrylonitrile with urea in a medium consisting essentially of sodium n-butoxide at a temperature from about 112° C. to about 115° C. with attending formation of cytosine.

6. A process for the preparation of cytosine which comprises reacting a b-alkoxy acrylonitrile, said alkoxy group having a carbon content $C_1$–$C_{10}$, with urea in a medium consisting essentially of an alkali metal alcoholate, said alcohol having a carbon content $C_1$–$C_{10}$, with attending formation of cytosine, removing produced alcohol, treating with sulfuric acid, heating, adding ethyl alcohol with maintenance of temperature, cooling, with separation of cytosine sulfate, filtering, dissolving the cytosine sulfate in water, adding ammonia thereto, whereby crude cytosine is precipitated, and purifying by separating the cytosine from the medium, dissolving it in water, decolorizing, removing decolorizing agent, and cooling with deposition of cytosine.

7. A process for the preparation of cytosine which comprises reacting b-ethoxy acrylonitrile with urea in a medium consisting essentially of an alkali metal alcoholate, said alcohol having a carbon content $C_1$–$C_{10}$, with attending formation of cytosine, removing produced alcohol, treating with sulfuric acid, heating to about 80° C., adding ethyl alcohol with maintenance of temperature from about 80° C. to about 85° C., cooling to a temperature of about 20° C. with separation of cytosine sulfate, filtering, dissolving the cytosine sulfate in water, adding ammonia thereto, whereby crude cytosine is precipitated, and purifying by separating the cytosine from the medium, dissolving it in water, decolorizing, removing decolorizing agent, and cooling with deposition of cytosine.

8. A process as defined in claim 6, in which the sulfuric acid has a concentration of 2 N.

9. A process as defined in claim 7, in which the ethyl alcohol is added during a period of one hour with a temperature of from 80° C. to 85° C. being maintained during the addition.

10. A process as defined in claim 6, in which the ammonia is added as ammonium hydroxide containing about 29% ammonia and the final cooling is to a temperature of about 20° C.

References Cited in the file of this patent

UNITED STATES PATENTS

| | | |
|---|---|---|
| 2,088,996 | Hoffer | Aug. 3, 1937 |
| 2,250,332 | Kuh | July 22, 1941 |
| 2,511,653 | Shand | June 13, 1950 |
| 2,602,794 | Hitchings et al. | July 8, 1952 |